March 19, 1963 B. N. McLEAN 3,082,392

COMPOSITE INFRARED RADIATION DETECTOR

Filed Feb. 17, 1959

INVENTOR.
BOB NORMAN McLEAN,
BY John M. Koch
ATTORNEY.

3,082,392

COMPOSITE INFRARED RADIATION DETECTOR

Bob N. McLean, Santa Barbara, Calif., assignor to Santa Barbara Research Center, Goleta, Calif., a corporation of California Filed Feb. 17, 1959, Ser. No. 793,930
3 Claims. (Cl. 338—18)

This invention relates to a radiation sensitive cell, and more particularly to a cell which is sensitive to radiation of infrared wavelength.

Many infrared devices require detectors including cells which exhibit satisfactory sensitivity in the range of radiation wavelengths from about 2 to about 10 microns. This is especially true in military applications of radiation detectors, such as the practical application of infrared sensing devices in guided missiles. Cells used in such devices should have, among other characteristics, a wide spectral response. The spectral response should be such that the cell employed will react to relatively low temperature radiant energy, such as that produced by the exhaust of a jet engine, for example. Background radiation, such as sunlight, which is strongest in the shorter radiation wavelength ranges, is commonly filtered out so that it does not affect the detector cell. The practical value of a detector thus depends primarily upon the sensitivity with which the longer wavelength radiation can be detected and the completeness with which the shorter wavelength radiation can be removed.

Prior art infrared radiation detector cells often do not have the desired spectral response. For example, although the sensitivity of a "*p*" type gold doped germanium detector cell extends from about 2 to nearly 10 microns wavelength, the sensitivity of this cell is undesirably low in portions of this sensitivity range. Similarly, the spectral response of a lead selenide detector cell is not entirely satisfactory for applications of the type discussed above. Lead selenide has a response which is low at about 2 microns, gradually reaches a peak in the region of about 4.7 microns and gradually decreases to a sharp cut-off at about 7 microns. In general, it appears to be true that the lead selenide cell exhibits a higher sensitivity than the gold doped germanium cell in the range where the lead selenide cell is sensitive, that is, up to about 7 microns, but the gold doped germanium cell has the advantage of showing a sensitivity to infrared radiations of longer wavelengths, that is, up to about 10 microns. Thus, neither of these detector cells exhibits the desired spectral response for infrared radiations in the range between about 2 and about 10 microns wavelength.

Accordingly, it is an important object of this invention to provide an infrared radiation sensitive cell which does not suffer from the disadvantages and defects of prior art infrared radiation detecting cells.

Another object is to provide an infrared radiation detecting cell which exhibits spectral response of a satisfactory degree in the range of about 2 to about 10 microns radiation wavelength.

Additional objects will become apparent from the following description, which is given primarily for purposes of illustration and not limitation.

Stated in general terms, the objects of my invention are attained by providing an infrared radiation sensitive cell which comprises a first semiconductor material or base, preferably doped with a small amount of a material such as gold, nickel, zinc, etc., and a second semiconductor material, preferably in the form of a film applied to a surface of the first semiconductor material. The semiconductor base and the semiconductor film are chosen so that their respective infrared radiation detecting characteristics are integrated in a manner to complement each other and produce a composite infrared radiation detector cell exhibiting the desired spectral response for a particular application. The structure of the cell of my invention is completed by attaching suitable electrodes to the base and film of the composite cell.

A more detailed description of a specific embodiment of my invention is given below with reference to the accompanying drawing wherein.

Figure 1:
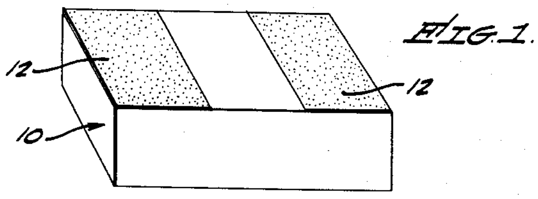
FIG. 1 is an isometric view showing a semiconductor base provided with two electrical conducting contacts.
Figure 2:
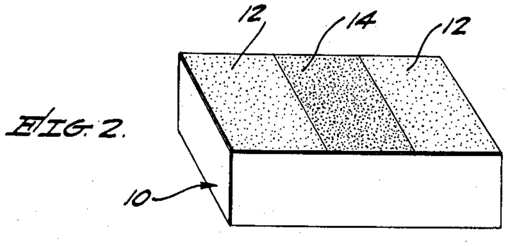
FIG. 2 is a similar view showing a second semiconductor material attached to the semiconductor base and making electrical connection with the electrical contacts.

The composite infrared detector cell comprises a block 10 of gold doped germanium. The gold is introduced into the germanium by adding a small amount of gold directly to a quantity of molten germanium or by plating gold on a block of germanium and then heating the gold plated germanium to cause gold to diffuse from the plating into the block. The block 10 is provided with two electrical contacts 12, as shown in the drawing. The contacts 12 may conveniently be formed by electroplating rhodium directly on spaced surfaces of the block 10. A lead selenide film 14 is then deposited on the block 10 in the space between the electrodes 12 so that the edges of the film 14 extend over the inner edges of the spaced rhodium electrodes 12 to make electrical contact therewith.

Figure 3:
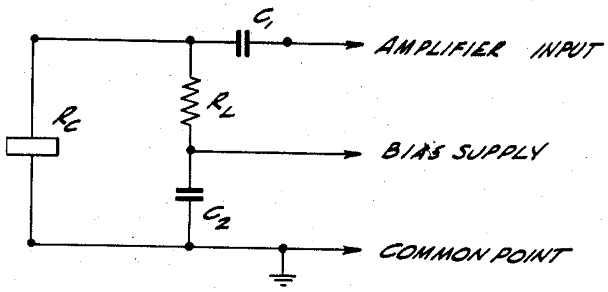
FIG. 3 is a schematic diagram showing an infrared detector cell connected in a circuit.

In operation, the resulting composite infrared detector cell is connected into suitable circuitry, as shown in FIG. 3, through the electrical contacts 12. In the diagram, $R_C$ is the infrared cell and $R_L$ is a load resistor. A suitable source of direct current (not shown) is connected between the bias supply and common point terminals. Capacitor $C_1$ is provided for D.C. blocking and signal coupling to the amplifier (not shown) through the amplifier input terminal. Capacitor $C_2$ effectively bypasses the bias supply at signal frequencies. Resistance $R_L$ generally, but not necessarily, is comparable in value to that of the cell $R_C$. Its purpose is to provide a D.C. path for the necessary bias current through the cell $R_C$, while at the same time offering a high shunt impedance to signal voltages impressed upon the amplifier for ultimate utilization. Impedance changes in the cell $R_C$ are brought about by the impingement of infrared radiation upon the lead selenide film 14 while it is exposed to the radiation.

Figure 4:
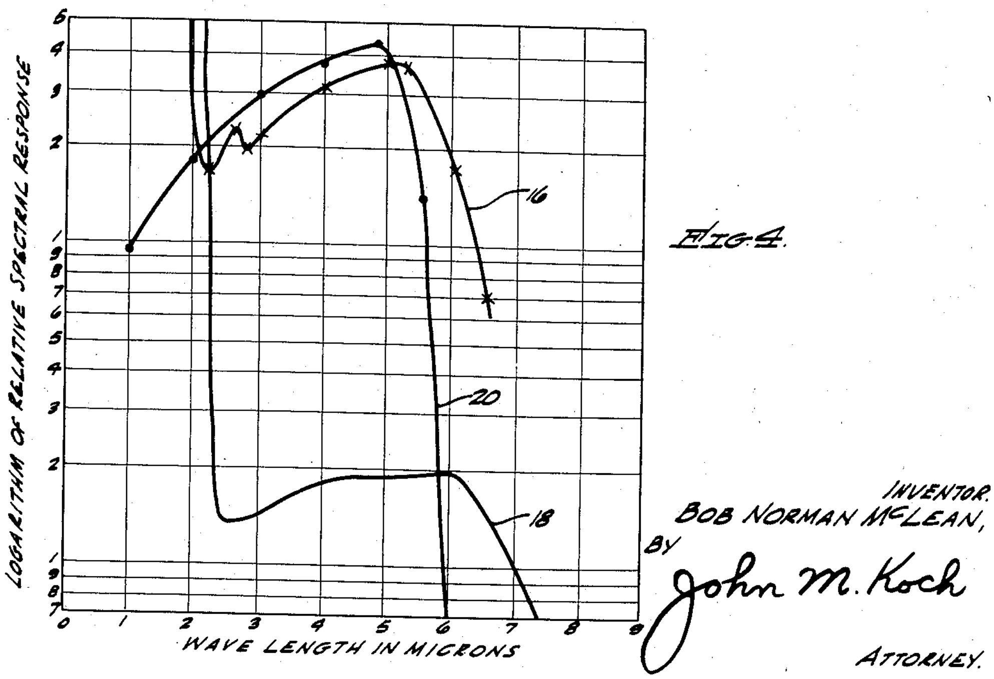
FIG. 4 is a graph showing comparative photoelectric response curves of a gold doped germanium cell, a lead selenide cell, and the composite cell, respectively.

The spectral response of the composite infrared cell of the invention is determined and measured by electronic means well-known in the art. A spectral response curve 16 for the specific composite cell described above is shown in FIG. 4 of the accompanying drawing. For comparison purposes, a spectral response curve 18 for a gold doped germanium cell and a similar curve 20 for a lead selenide cell also are shown in FIG. 4. It will be seen that a gold doped germanium cell gives rise to a spectral response curve 18 which shows a break at about 6 microns and a tail portion which extends beyond 7 microns, but at a lower level. The spectral response curve 20 produced by a lead selenide cell shows a peak at 4.8 microns and a sharp fall-off in response beyond the 4.8 microns peak.

It will be noted that in the curve 16 resulting from the composite cell, the peak response has been advanced to about 5.2 microns. This is believed to be caused by the influence of the gold doped germanium in the composite cell. It is also to be noted that the overall response in the range from 2 to 6 microns, as compared to the peak intrinsic response, is higher by a factor of 10 than that of the gold doped germanium cell. The relatively high plateau over the region from 2 to 6 microns is of extreme importance in practical applications of the cell for detecting radiation from jet engine exhaust.

The practical application of infrared sensing devices in guided missiles is dependent primarily upon three parameters which describe the characteristics of the radiation detector used in the cell. The first of these parameters is the minimum detectable energy; the second is the spectral response; and the third is the time constant. A radiation detector which will respond to very weak radiant energy is, of course, much more useful than one which cannot produce a response signal at least equal in magnitude to the noise of the cell when exposed to such weak radiation. The high output of the composite cell of my invention is, therefore, very desirable. The outstanding advantage of this composite cell is, however, found in the spectral region in which its relatively high response is available. A detector in a missile is required to react to relatively low temperature energy such as is produced by exhaust gases from a jet engine. Furthermore, it has been found that the plateaus exhibited in spectral response curves of composite cells of this invention are at optimum values for many practical applications other than the detection of radiant energy from exhaust gases.

Other semiconductor materials than germanium can be used as the base material in the composite cell of my invention. Among such semiconductor materials are silicon, alloys of silicon and germanium, and materials made up of solid elements of the third and fifth groups of the periodic table. Also, the lead selenide film can be replaced by other semiconductor or photosensitive materials such as lead sulfide, lead telluride, mercuric selenide and cadminum sulfide. Similarly, other conducting materials than rhodium, such as the platinum metals, can be used for forming the electrical contacts 12.

By way of example, a composite cell, according to the invention, was produced by depositing a film of lead sulfide upon a block of gold doped germanium. The spectral response and "NEP" of this composite cell and of a gold doped germanium cell were measured. "NEP" is an abbreviation for noise equivalent power, that is, the smallest amount of radiant energy which, when focused upon a detector will give a signal-to-noise ratio of unity, and is, therefore, a measure of the minimum detectable radiant energy of a given cell. The resistance of the gold doped germanium bar was 1 M ohm before lead sulfide was deposited thereon and the resistance of the composite cell was 0.9 M ohm. The NEP of the gold doped germanium bar was $4.9 \times 10^{-8}$ watts, and the NEP of the composite cell was $3.8 \times 10^{-8}$ watts. This represents an improvement of about 35% in NEP.

In another example, a composite cell was formed by depositing a layer of lead sulfide on a substrate of gold doped germanium. The resistance of the gold doped germanium bar was 750 K. before lead sulfide was deposited thereon and the resistance of the composite cell was 500 K. The NEP of the gold doped germanium cell was $4.4 \times 10^{-9}$ watts and the NEP of the composite cell was $1.24 \times 10^{-9}$ watts. This represents an improvement of about 71% in NEP.

It will be apparent that many variations in the materials, combinations of materials and methods of constructing the composite cell of my invention will occur to a person skilled in the art. The materials and methods given hereinabove are presented primarily for descriptive and illustrative purposes and I intend my invention to be limited only by the scope of the appended claims.

What is claimed is:

1. An infrared radiation detector cell having a high degree of spectral response in the range of about 2 to about 10 microns radiation wavelength comprising essentially a gold doped germanium base, a film of infrared sensitive material selected from the group consisting of lead selenide and lead sulfide deposited directly on the base ,and a pair of spaced electrodes connected to the base and the film, said base and said film having respective infrared radiation responsive characteristics that are integrated to complement each other to provide a predetermined composite infrared detector, and said spaced electrodes being adapted for connection to external circuitry for electrically registering changes in said cell which vary in accordance with impingement thereon of infrared radiation.

2. An infrared radiation detector cell having a high degree of spectral response in the range of about 2 to about 10 microns radiation wavelength comprising essentially a gold doped germanium base, a film of infrared sensitive lead selenide deposited directly on the base, and a pair of spaced electrodes connected to the base and the film, said base and said film having respective infrared radiation responsive characteristics that are integrated to complement each other to provide a predetermined composite infrared detector, and said spaced electrodes being adapted for connection to external circuitry for electrically registering changes in said cell which vary in accordance with impingement thereon of infrared radiation.

3. An infrared radiation detector cell having a high degree of spectral response in the range of about 2 to about 10 microns radiation wavelength comprising essentially a gold doped germanium base, a film of infrared sensitive lead sulfide deposited directly on the base, and a pair of spaced electrodes connected to the base and the film, said base and said film having respective infrared radiation responsive characteristics that are integrated to complement each other to provide a predetermined composite infrared detector, and said spaced electrodes being adapted for connection to external circuitry for electrically registering changes in said cell which vary in accordance with impingement thereon of infrared radiation.

References Cited in the file of this patent

UNITED STATES PATENTS

| | | |
|---|---|---|
| 2,742,550 | Jenness | Apr. 17, 1956 |
| 2,743,430 | Schultz et al. | Apr. 24, 1956 |
| 2,788,381 | Baldwin | Apr. 9, 1957 |
| 2,860,218 | Dunlap | Nov. 11, 1958 |
| 2,861,229 | Pankove | Nov. 18, 1958 |
| 2,907,969 | Sedensticker | Oct. 6, 1959 |
| 2,965,867 | Greig | Dec. 20, 1960 |